INVENTORS
Homer R. Howell, Donald M. Lamaster
and David L. Roeder.

3,381,205
PHASE SHIFT REGULATED ELECTRICAL INVERTER SYSTEM
Homer R. Howell, Lima, Ohio, Donald M. Lamaster, Santa Ana, Calif., and David L. Roeder, Dayton, Ohio, assignors to Westinghouse Electric Corporation, Pittsburgh, Pa., a corporation of Pennsylvania
Filed Sept. 14, 1965, Ser. No. 487,255
7 Claims. (Cl. 321—18)

ABSTRACT OF THE DISCLOSURE

A regulated electrical inverter system which generates and vectorially sums two sine wave voltages, and which controls the phase angle between them in response to an error signal, by momentarily changing the frequency of one of the voltages. The system includes means for limiting the phase angle swing, and for controlling the actual phase angle between predetermined minimum and maximum limits.

---

This invention relates in general to electrical control apparatus, and more particularly to voltage regulating and current limiting circuits for inverter systems.

The output voltage of an electrical inverter may be regulated and the output current limited by utilizing the principles of phase shaft regulation, wherein two sine wave voltages are generated and vectorially summed to provide the required output voltage. When the required output voltage magnitude is being provided, the frequencies of the two voltages are the same. Voltage regulation and current limiting is achieved by controlling the phase angle between the two voltages in response to an error signal. The phase angle is controlled by changing the frequency of one of the voltages while maintaining the frequency of the second voltage constant. When the phase angle required to provide the desired output voltage magnitude is achieved, the frequency of the variable frequency voltage will be controlled to again be the same as the constant frequency voltage.

Inverters utilizing phase shift regulation have been constructed utilizing magnetic amplifiers to control the frequency of the variable frequency voltage. Such systems, however, have the disadvantage of requiring two magnetic amplifiers for each countdown stage of the inverter, as well as the problems associated with balancing magnetic amplifier circuits, and the relatively slow response time of the magnetic amplifiers to load changes.

It would be desirable to provide an electrical inverter system which utilizes the principles of phase shift voltage regulation and current limiting, and which utilizes a master oscillator to provide the fixed frequency voltage and a variable frequency oscillator to provide the controllable frequency voltage. Only one master oscillator and one variable frequency oscillator would be required for the system, regardless of the number of countdown stages, and the system would have a very fast transient response time. In order to effectively regulate such a system, however, it is essential that the total angular swing of the variable frequency voltage be limited to 180°, and that the actual angle between the fixed and variable frequency voltages vary between 0 and —180° (leading), of 0 and +180° (lagging). Otherwise, the error or feedback signal would change polarity when the angle varies outside of these limits, making voltage regulation and current limiting impossible to achieve.

Accordingly, it is an object of the invention to provide a new and improved electrical inverter system which utilizes the principles of phase shift regulation.

Another object of the invention is to provide a new and improved electrical inverter system which has a minimum number of components, a high efficiency, and fast transient response time to load changes.

A further object of the invention is to provide a new and improved electrical inverter system which utilizes one master oscillator and one variable frequency oscillator, regardless of the number of countdown stages in the system.

Still another object of the invention is to provide a new and improved electrical inverter system which utilizes phase shift regulation, and which limits the angular swing of the variable frequency voltage to 180°.

Another object of the invention is to provide a new and improved electrical inverter system which utilizes a master and variable frequency oscillator, phase shift voltage regulation, and current limiting, which limits the angular swing of the variable frequency voltage to 180°, and which varies the phase angle between 0 and —180° (leading), or between 0 and +180° (lagging).

A further object of the invention is to provide a new and improved phase angle regulated electrical inverter system which automatically locks the constant and variable frequency voltages in phase when they are in phase, or substantially in phase, and which automatically unlocks the voltages when the system voltage increases above the regulated magnitudes or when the output current exceeds its predetermined limit.

Briefly, the present invention accomplishes the above cited objects by providing an electrical inverter system which utilizes a master oscillator to provide a first sine wave voltage whose frequency is fixed, and a variable frequency oscillator to provide a second sine wave voltage whose frequency is controlled in response to an error or feedback signal. The first and second voltages are vectorially summed to provide the output voltage of the inverter. When the output voltage is at the desired regulated magnitude, the frequencies of the first and second voltages will be the same. When the output voltage is not at the regulated magnitude, the feedback signal will momentarily change the frequency of the second voltage to change the phase angle until the output voltage is again at the desired regulated magnitude. The frequency of the variable frequency oscillator will change only long enough to effect the desired phase angle change, and its frequency will again be the same as that of the master oscillator when the phase angle change has been completed. In the event the output current exceeds a predetermined limit, the variable frequency oscillator will change the phase angle to provide an output voltage which will not supply current beyond the preset limit. Thus, the current limiting circuit overrides the voltage regulator circuit when the load current exceeds the predetermined limit.

In order to make voltage regulation and current limiting possible with this arrangement, steering and forced turn-on means are utilized to limit the total angular swing of the second voltage to 180°, and to vary the actual angle between 0 and —180°, or between 0 and +180°.

In-phase locking means are provided which may be utilized to provide maximum system efficiency when the first and second voltages are in phase, or substantially in phase. The in-phase locking means is automatically de-energized when the output voltage rises above the regulator setting, or the output current exceeds the preset limit.

Further objects and advantages of the invention will become apparent as the following description proceeds and features of novelty which characterize the invention will be pointed out in particularity in the claims annexed to and forming a part of this specification.

For a better understanding of the invention, reference may be had to the following detailed description, taken in connection with the accompanying drawings, in which.

Referring now to the drawings, and FIG. 1 in particular, there is illustrated a vector diagram 10 which illustrates the principles of phase shift regulation utilized in the electrical inverter system which will be hereinafter described. In phase shift regulation, a first sine wave voltage having a fixed frequency is generated, represented by vector 12, a second sine wave voltage having a controllable frequency is generated, represented by vector 14, and the first and second voltages are vectorially summed to provide the output voltage, represented by vector 16. In order to maintain the output voltage or vector 16 at a predetermined magnitude, the phase angle θ between vector 12 and vector 14 is controlled in response to a voltage responsive feedback or error signal such that the vector sum of vectors 12 and 14 will be maintained at the desired magnitude. Current limiting may also be employed by utilizing a voltage-current responsive feedback signal which will regulate the voltage to the desired magnitude as long as the current is within a predetermined range. When the current limit is reached, the voltage will be limited to that magnitude which will provide only the limit current magnitude.

When vector 16 has a magnitude equal to the regulator setting, the frequency of the voltage represented by vector 14 will be the same as the frequency of the voltage represented by vector 12. When the magnitude of vector 16 changes, the frequency of vector 14 will be momentarily changed to change the angle θ to a value which will again produce the desired magnitude for vector 16. As shown in FIG. 1, with vector 14 leading vector 12, the frequency of vector 14 must decrease to increase the output voltage vector 16, and increase to decrease the output voltage vector 16. After changing the angle θ to the new value, the frequency of vector 14 will change back to the frequency of vector 12 to maintain the new phase angle.

Figure 1:
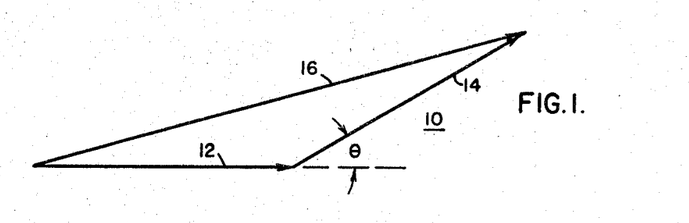
FIGURE 1 is a vector diagram which illustrates the principles of phase shift voltage regulation.

It will be noted by observing the vector diagram 10 of FIG. 1 that in order for this system of voltage regulation and current limiting to operate successfully, that the total angular swing of the swinging vector 14 must be limited to 180°, and that the actual angle must vary between 0 and −180°, or between 0 and +180°. The polarity of the error signal would change if these limits were to be exceeded, making voltage regulation and current limiting impossible to achieve. Thus, a regulated electrical inverter system which generates and vectorially sums two sine wave voltages, and which controls the phase angle between them by momentarily changing the frequency of one of the voltages, must incorporate means for limiting the phase angle swing, and for controlling the actual angles between predetermined minimum and maximum limits.

By observing the vector diagram 10 of FIG. 1, it will also be evident that the maximum efficiency of an electrical inverter system utilizing phase shift regulation would occur when the vectors 12 and 14 are in phase, with the angle θ being zero degrees. If the electrical inverter system is designed such that the angle θ can approach zero degrees, it would be desirable to lock the frequency of vector 14 to the frequency of vector 12 when the phase angle θ approaches zero degrees. This would provide maximum operating efficiency, and also prevent the phase angle θ from bouncing or oscillating between zero degrees and an angle close to zero degrees. Thus, it would be desirable to provide means which would sense when the phase angle θ is zero, and lock the frequency of vector 14 to the frequency of vector 12. The locking means must automatically be deenergized in the event the vector 16 starts to increase above the preset magnitude, or the output current reaches the predetermined limit, in order to restore the system to its regulating mode.

Figure 2:
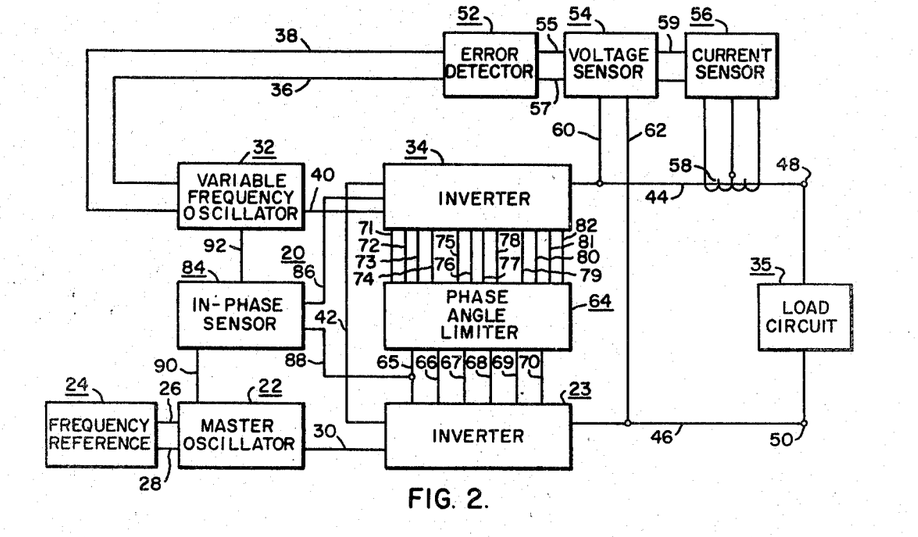
FIG. 2 is a block diagram which functionally illustrates a complete electrical inverter system constructed according to the teachings of the invention.

A block diagram of an electrical inverter system 20 which generates and vectorially sums two sine wave voltages, and which utilizes phase shift regulation to achieve voltage regulation and current limiting, is shown in FIG. 2. Electrical inverter system 20 incorporates means for limiting the phase angle between the two voltages to a predetermined range, and also incorporates an in-phase locking means for locking the two voltages in phase when the phase angle is zero, or substantially zero degrees.

More specifically, a first sine wave voltage is generated by master oscillator 22 and inverter 23, with the frequency of the master oscillator being fixed by frequency reference 24. The output signal from frequency reference 24 is applied to the master oscillator 22 through electrical conductors 26 and 28, and the signals from master oscillator 22 which control the frequency of inverter 23, are applied to inverter 23 through electrical conductor 30. Inverter 23 generates the first sine wave voltage, which is represented by vector 12 of FIG. 1.

A second sine wave voltage, which is represented by vector 14 in FIG. 1, is generated by variable frequency oscillator 32 and inverter 34. The frequency of the variable frequency oscillator 32 is controlled by a voltage-current responsive error signal applied to variable frequency oscillator 32 through electrical conductors 36 and 38, and the frequency of the voltage generated by inverter 34 is in turn controlled by signals from variable frequency oscillator 32 applied to inverter 34 through electrical conductor 40.

The voltage generated by inverter 23 is vectorially added to the voltage generated by inverter 34, with electrical conductor 42 connecting the two voltages in series, and the vector sum of the two voltages, represented by vector 16 in FIG. 1, appears at electrical conductors 44 and 46, and is applied to load circuit 35 through output terminals 48 and 50.

The error signal applied to variable frequency oscillator 32 is obtained from error detector circuit 52, voltage sensor 54, and current sensor 56. The current sensor 56 is responsive to the output current in conductor 44 of inverter system 20 through current transformer means 58, and the voltage sensor 54 is responsive to the voltage across electrical conductors 44 and 46 through electrical conductors 60 and 62. The signal responsive to current flow is applied to the voltage sensor 54 through electrical conductor 59. If the current responsive signal is below a predetermined limit, the signal applied to the error detector 52 through electrical conductors 55 and 57 will be voltage responsive. If the current responsive signal reaches the predetermined limit, the signal applied to error detector 52 will be current responsive. The voltage or current responsive signal applied to error detector 52 is compared with a reference, and any deviation of the signal from the reference is applied to the variable frequency oscillator 32 through electrical conductors 36 and 38, as an error signal. Thus, the output voltage of electrical inverter system 20 is regulated to a desired predetermined magnitude when the output current is below a preset limit. When the output current reaches the preset limit, the output voltage is regulated to that value necessary to keep the output current from exceeding the limit magnitude.

In order to limit the total angular swing of the swinging vector 14 shown in FIG. 1 to 180°, and in order to vary the actual phase angle $\theta$ between 0 and 180°, or between 0 and +180°, a phase angle limiter circuit 64 is connected between inverter 23 and inverter 34. Assuming that the phase angle $\theta$ is to be limited to the range of 0 to −180°, steering circuits in the phase angle limiter 64 prevent the voltage from inverter 34 from leading the voltage from inverter 23, by more than 180°, and forced turn-on circuits in the phase angle limiter 64 prevent the voltage from inverter 34 from lagging the voltage of inverter 23. Phase angle limiting circuit 64 is responsive to inverter 23 through electrical conductors 65, 66, 67, 68, 69 and 70, and phase angle limiter 64 controls the angular swing of the voltage output of inverter 34 through electrical conductors 71, 72, 73, 74, 75, 76, 77, 78, 79, 80, 81 and 82.

In order to sense when the output voltage of inverter 34 is in-phase with the output voltage of the inverter 23, and to lock the two voltages in-phase until the output voltage of electrical inverter system 20 rises above the desired magnitude, or the output current reaches the preset limit, an in-phase sensor 84 is provided which is responsive to the phase relation of the output voltage of inverters 34 and 23 through electrical conductors 86 and 88. When the two voltages are in-phase, the signal from frequency reference 24 is applied to the variable frequency oscillator 32 through electrical conductors 90 and 92. The signal from frequency reference 24 prevents the variable frequency oscillator from operating at a frequency below the reference frequency, but does not prevent the variable frequency oscillator 32 from operating at a higher frequency, thus allowing the variable frequency oscillator 32 to increase its frequency and reduce the output voltage when the output voltage of the electrical inverter system 20 rises above the regulator setting, or the output current reaches the preset limit. The synchronizing signal from frequency reference 24 is removed from variable frequency oscillator 32 when the phase angle $\theta$ reaches a predetermined magnitude, in order to restore normal operation to the variable frequency oscillator 32, wherein it is necessary for the variable frequency oscillator 32 to be able to both increase and decrease its frequency.

Figure 3A:
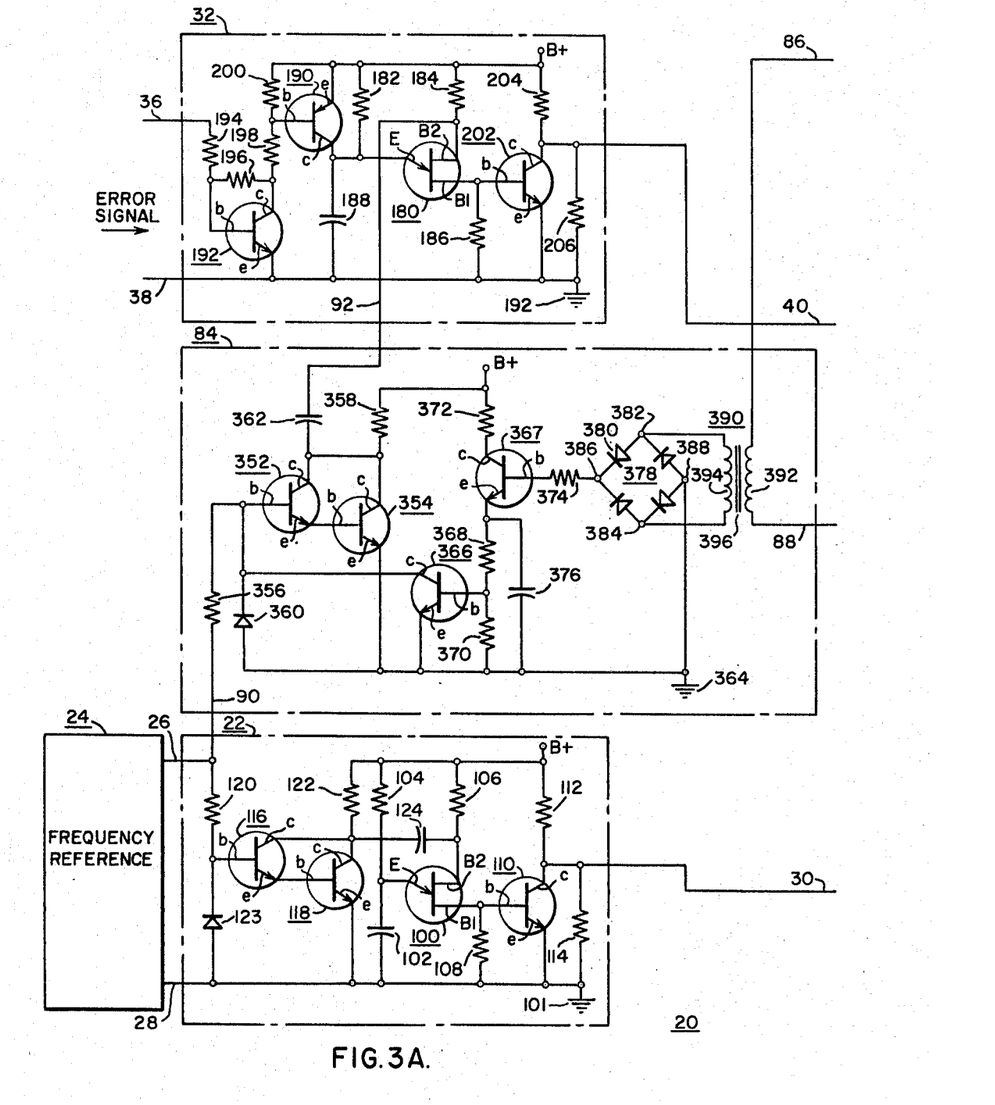
FIGS. 3A and 3B are schematic diagrams illustrating an electrical inverter system constructed according to the teachings of the invention.
Figure 3B:
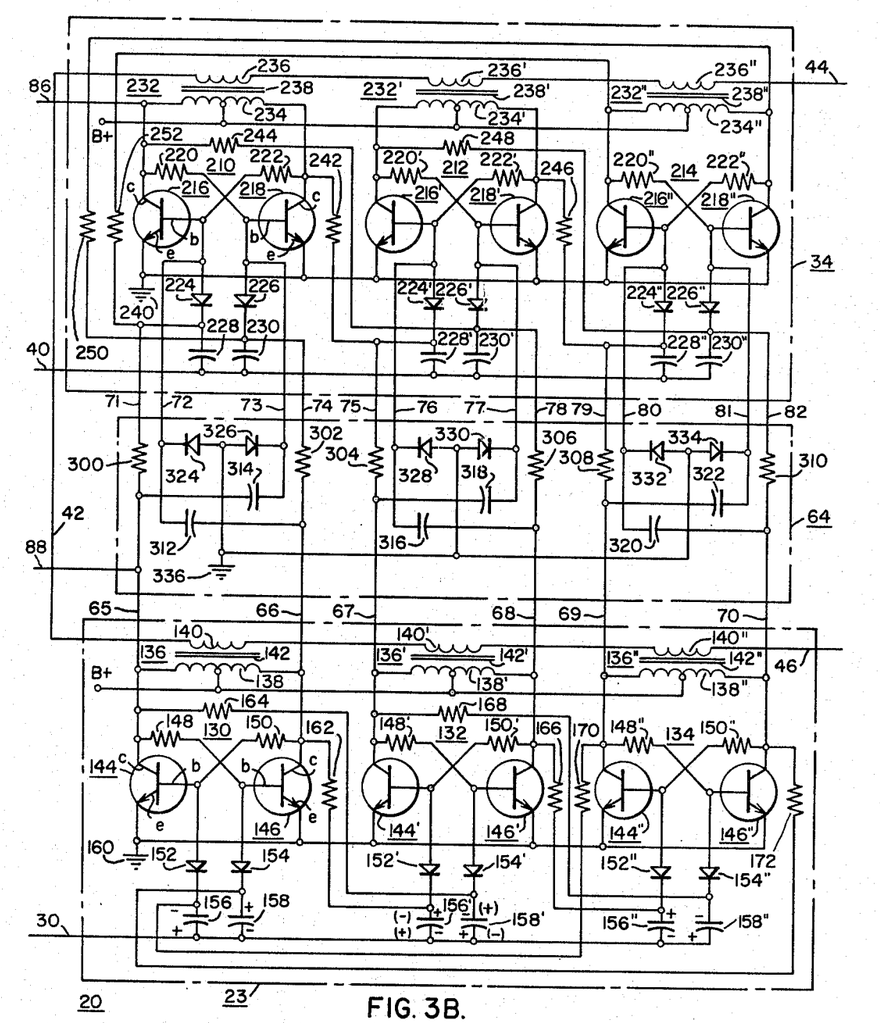
Figure 4:
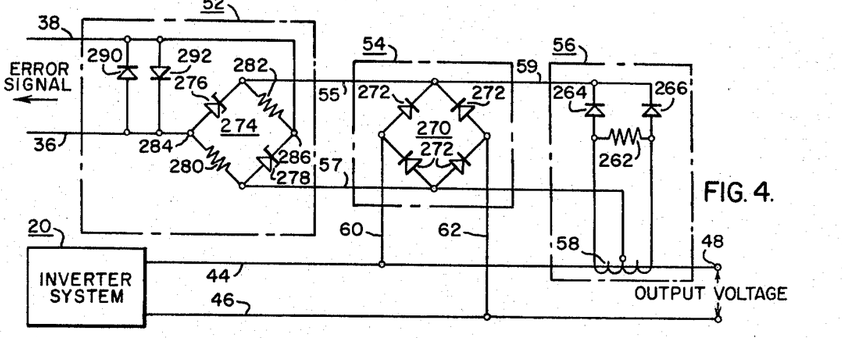
FIG. 4 is a schematic diagram of a voltage-current feedback arrangement, which may be utilized with the electrical inverter system shown in FIGS. 3A and 3B.

FIGS. 3A, 3B and 4 schematically illustrate the electrical inverter system 20 shown in block form in FIG. 2, with like reference numerals in the various figures indicating like components. FIGS. 3A and 3B illustrate frequency reference 24, the master and variable frequency oscillators 22 and 32, respectively, inverters 23 and 34, in-phase sensor 84, and phase angle limiting circuit 64, while FIG. 4 illustrates the error signal producing means comprising current sensor 56, voltage sensor 54, and error detector circuit 52.

In general, the electrical inverter system shown in FIGS. 3A and 3B generates sine wave voltages by the harmonic neutralization method, which is described in detail in copending application Ser. No. 117,966, filed June 19, 1961, and assigned to the same assignee as the present application. However, it will be evident that other inverter methods of generating sine waves may also be utilized.

The fixed frequency sine wave voltage, represented by vector 12 in FIG. 1, is generated by frequency reference 24, master oscillator 22, and inverter 23. The master oscillator 22 shown in FIG. 3A comprises a unijunction transistor relaxation oscillator, a pulse shaping and power amplifying circuit for the unijunction transistor relaxation oscillator output signal, and a triggering circuit which synchronizes the output signals of the master oscillator 22 with the frequency reference signal from frequency reference 24. The unijunction transistor relaxation oscillator includes a unijunction transistor 100 having a rectifying contact or emitter electrode E and two ohmic contacts or electrodes base-one (B1) and base-two (B2), capacitor 102, and resistors 104, 106 and 108. Resistor 104 and capacitor 102 are serially connected, with resistor 104 being connected to a source of unidirectional potential represented by terminal B+, and capacitor 102 being connected to ground 101. The emitter electrode E of unijunction transistor 100 is connected to the junction of the serially connected resistor 104 and capacitor 102. Resistor 106 is connected from B+ to base-two (B2) of the unijunction transistor 100, and resistor 108 is connected from base-one (B1) to ground 101. When a unidirectional potential is applied to terminal B+, capacitor 102 begins to charge, increasing the voltage at the emitter electrode E. When the voltage at the emitter electrode E reaches a predetermined magnitude, the emitter becomes forward biased, and the dynamic resistance between the emitter and base-one (B1) drops to a low value, allowing capacitor 102 to discharge through the emitter E and generate a positive current pulse at base-one (B1). When the voltage at the emitter E drops to a predetermined magnitude, the emitter E ceases to conduct, allowing capacitor 102 to again charge, and repeat the cycle. The frequency of oscillation may be synchronized by negative current pulses applied to base-two (B2).

The triggering circuit which produces the synchronizing pulses for synchronizing the output frequency of master oscillator 22 with the frequency of frequency reference 24 comprises transistors 116 and 118, which may be of the NPN junction type, as shown, each having an emitter electrode $e$, a base electrode $b$, and a collector electrode $c$, resistors 120 and 122, a diode or rectifier 123, and capacitor 124. Resistor 120 and diode 123 are serially connected across the output of frequency reference 24, with resistor 120 being connected to electrical conductor 26 and diode 123 being connected to electrical conductor 28. Diode 123 is poled to conduct electrical current from electrical conductor 28 to electrical conductor 26. Transistor 116 has its base electrode $b$ connected to the junction between resistor 120 and diode 123, its collector electrode $c$ connected to the collector electrode $c$ of transistor 118, and its emitter electrode $e$ connected to the base electrode $b$ of transistor 118. The collector electrodes $c$ of transistors 116 and 118 are connected to B+ through resistor 122 and to base-two (B2) of the unijunction transistor 100 through coupling capacitor 124. The emitter electrode $e$ of transistor 118 is connected to electrical conductor 28 and ground 101.

Frequency reference 24 may be any conventional pulse or square wave generator capable of producing and applying positive pulses to electrical conductor 26 at the frequency that master oscillator 22 is to operate. Diode 123 is required in the event that frequency reference 24 also produces negative pulses or negative square waves, shorting the negative cycle away from the base electrode $b$ of transistor 116. The positive pulses or square waves from frequency reference 24 forward bias the base-emitter junction of transistor 116, switching transistor 116 from its non-conducting condition to a conductive condition, allowing current flow through its collector-emitter junction. This current flow forward biases the emitter-base junction of transistor 118, switching it to its conductive condition and connecting capacitor 124 to ground 101. Capacitor 124, being connected to ground 101 lowers the potential of base-two (B2) and thus acts as a negative pulse, which synchronizes the production of positive pulses at base-one (B1) with the reference frequency of frequency reference 24.

The positive pulses at base-one (B1) of unijunction transistor 100 are applied to the pulse shaping and power amplifier circuit, which includes transistor 110, which may be of the NPN junction type, having a base electrode $b$, a collector electrode $c$, and an emitter electrode $e$, and resistors 112 and 114. The base electrode $b$ of transistor 110 is connected to base-one (B1) of unijunction transistor 100, and the emitter electrode $e$ of transistor 110 is connected to ground 101. Resistors 112 and 114 are serially connected from terminal B+ to ground, with the collector electrode $c$ being connected to the junction between resistors 112 and 114.

When a positive current pulse is applied to the base electrode b of transistor 110 from base-one (B1) of unijunction transistor 100, transistor 110 is switched to its conductive condition, connecting electrical conductor 30, which couples the master oscillator 22 with inverter 23, to ground 101. Thus, in the absence of a signal at the base of transistor 110, transistor 110 is in its non-conductive condition, and the potential applied to electrical conductor 30 is determined by the potential applied to terminal B+ and by the voltage divider comprising resistors 112 and 114. When the transistor 110 is switched to its conductive state, electrical conductor 30 will be connected to ground 101 through transistor 110.

To reduce the number of interconnections in the drawings to a minimum, each grounded portion of the circuit is shown with its own ground, instead of showing all of the various portions of the circuit having their grounded portions connected together and grounded to a single point. Further, the individual grounding points are given different reference numerals to aid in explaining the connections of the various circuit components. It is to be understood that although given different numbers, that the grounding points are all interconnected.

Electrical inverter 23 produces a sine wave voltage, having a fixed frequency determined by fixed frequency reference 24 and master oscillator 22. Electrical inverter 23 produces the sine wave voltage by the harmonic neutralization method, as described in the hereinbefore mentioned copending application. Three countdown stages or flip-flop switching networks 130, 132 and 134 are illustrated in FIG. 3B. However, any desired number of countdown stages may be employed. Since each count-stage is similar, only one will be described in detail, with the corresponding component in the other countdown stages being given the same reference numeral, with one prime mark being added to the reference numerals to distinguish stage 132 and two prime marks being added to the reference numerals to distinguish stage 134. Countdown stage 130 includes transformer 136 having a primary winding 138 and a secondary winding 140 disposed in inductive relation with a magnetic core 142, first and second transistors 144 and 146, which may be of the NPN junction type shown, each having a collector electrode c, an emitter electrode e, and a base electrode b, first and second resistors 148 and 150, first and second diodes or rectifiers 152 and 154, and first and second capacitors 156 and 158.

The base electrode b of transistor 144 is connected to the collector electrode c of transistor 146, through resistor 150, and the base electrode b of transistor 146 is connected to the collector electrode c of transistor 144 through resistor 148. The collector electrodes c of transistors 144 and 146 are each connected to opposite sides of the primary winding 138 of transformer 136. The emitter electrodes e of transistors 144 and 146 are connected to ground 160. Diode 152 and capacitor 156 are serially connected from the base electrode b of transistor 144 to the electrical conductor 30, with diode 152 being poled to conduct current from the base electrode b to the electrical conductor 30. In like manner, diode 154 and capacitor 158 are serially connected from the base electrode b of transistor 146 to the electrical conductor 30, with diode 154 being poled to conduct electrical current from the base electrode b to the electrical conductor 30.

Countdown stage 130 is coupled with countdown stage 132 through resistors 162 and 164, with resistor 162 being connected from the collector electrode c of transistor 146 to the junction between diode 152' and capacitor 156', and resistor 164 being connected from the collector electrode c of transistor 144 to the junction between diode 154' and capacitor 158'.

Countdown stage 132 is coupled with countdown stage 134 through resistors 166 and 168, with resistor 166 being connected from the collector electrode c of transistor 146' to the junction between diode 152'' and capacitor 156'', and resistor 168 being connected from the collector electrode c of transistor 144' to the junction between diode 154'' and capacitor 158''.

Countdown stage 134 is coupled with countdown stage 130 through resistors 170 and 172, with resistor 170 being connected from the collector electrode c of transistor 144'' to the junction between diode 152 and capacitor 156, and resistor 172 being connected from the collector electrode c of transistor 146'' to the junction between diode 154 and capacitor 158.

The unidirectional potential at terminal B+ is connected to each of the primary windings 138, 138' and 138'' of transformers 136, 136' and 136''. The secondary windings 140, 140' and 140'' are connected serially, with secondary winding 140 being connected to electrical conductor 42 and to secondary winding 140', and secondary winding 140'' being connected to secondary winding 140' and to electrical conductor 46.

In the operation of electrical inverter 23, assume that transistors 144, 144' and 144'' are in their conductive states, and transistors 146, 146' and 146'' are cut-off or in their non-conducting states. When transistors 144, 144' and 144'' are conducting, capacitors 158', 158'' and 156, will be charged as shown in FIG. 3B, since one side of each of the capacitors is connected to electrical conductor 30 which has a positive potential thereon, determined by the potential applied to terminal B+ and the voltage divider comprising resistors 112 and 114, and the other sides of capacitors 158', 158'' and 156 are connected to ground 160 through the conducting transistors 144, 144' and 144'' respectively. Capacitors 158, 156' and 156'' are oppositely charged, as their charge is responsive to the non-conductive transistors 146'', 146, and 146', respectively, with the unidirectional potential B+ on the collectors of the non-conducive transistors exceeding the voltage on electrical conductor 30.

When master oscillator 22 produces a positive pulse at base-one (B1) of the unijunction transistor 100, switching transistor 110 to its conductive state, the electrical conductor 30 will be connected to ground 101 through transistor 110. The charge on capacitors 158', 158'' and 156 will negative bias transistors 146', 146'' and 144 for a short period of time, switching transistor 144 to its non-conductive condition. Transistors 146' and 146'' are not affected, since they were already in their non-conductive condition. When transistor 144 switches to its non-conductive condition, transistor 146 is forward biased by resistor 148, and is thus switched to its conductive condition. The change in the operating condition of countdown stage 130 changes the polarities of capacitors 156' and 158', with the polarities on the remaining capacitors being unchanged. The new polarities of capacitors 156' and 158' are shown in brackets. The next pulse from base-one (B1) again connects electrical conductor 30 to ground 101 through transistor 110, with capacitors 156, 156' and 158'' reverse biasing transistors 144, 144' and 146'', respectively, switching transistor 144' to its non-conductive condition and switching transistor 146' to its conductive condition, by virtue of the forward bias applied by resistor 148. Transistors 144' and 146'' are not affected by the connecting of the electrical conductor 30 to ground 101, as they were already in their non-conductive conditions. The flip-flop action of a countdown stage 132 changes the polarities of capacitors 156'' and 158'', with the next pulse from unijunction transistor 100 causing transistor 146'' to be switched to its non-conductive condition, which switches transistor 146'' to its conductive condition. This sequence continues, with the sequence of transistor turn-on being 144, 144', 144'', 146, 146' and 146''. Different interconnections between the countdown stages may be utilized, however, to obtain any desired turn-on sequence.

The fixed frequency sine wave voltage represented by vector 12 in FIG. 1 is thus developed across the serially connected secondary windings 140, 140' and 140" of transformers 136, 136' and 136".

The swinging vector 14 of FIG. 1, or sine wave voltage whose frequency is controllable to obtain voltage regulation and current limiting is generated by variable frequency oscillator 32 and inverter 34. Variable frequency oscillator 32, like master oscillator 22, includes a unijunction relaxation oscillator and pulse forming and amplification means. However, instead of being synchronized with a frequency reference, variable frequency oscillator 32 is modified with a class A amplifier such that the frequency or variable frequency oscillator 32 may be either increased or decreased in response to an appropriate signal.

More specifically, the variable frequency oscillator 32 includes a relaxation oscillator comprising unijunction transistor 180 having an emitter electrode E, a base-one (B1) electrode, and a base-two (B2) electrode, resistors 182, 184, 186, a capacitor 188, and a transistor 190, which may be of the PNP junction type having a base electrode b, an emitter electrode e, and a collector electrode c. The emitter electrode e of transistor 190 and one side of resistor 182 are connected to a unidirectional potential B+, and the other side of the resistor 182 is connected to the collector electrode c of transistor 190, to form a parallel circuit comprising the emitter-collector electrodes of transistors 190 and resistor 182. Capacitor 188 is connected to the collector electrode c of transistor 190 and to ground 192, thus forming a series circuit from B+ to ground 192 which includes the parallel connected resistor 182 and transistor 190, and capacitor 188. The emitter electrode E of unijunction transistor 180 is connected to the collector electrode c of transistor 190, base-two (B2) is connected to the unidirectional potential B+ through resistor 184, and base-one (B1) is connected to ground 192 through resistor 186.

The frequency of the variable frequency oscillator 32 is determined by transistor 190, resistor 182 and capacitor 188. Since resistor 182 and capacitor 188 are fixed, the frequency of the variable frequency oscillator 32 is controlled by controlling the impedance of transistor 190. Resistor 182 is connected in parallel with transistor 190 in order to desensitize the circuit and limit the frequency swing of the oscillator. This also limits the unbalance in volt-seconds that will be applied to the transformer in inverter 34 to prevent saturation of the magnetic core.

The class A amplifier which controls the impedance of transistor 190, and thus the frequency of the variable frequency oscillator 82, includes transistor 192, which may be of the NPN junction type having a base electrode b, an emitter electrode e, and a collector electrode c, and resistors 194, 196, 198 and 200. The base electrode b of transistor 192 is connected to electrical conductor 36 through resistor 194, the emitter electrode e is connected to electrical conductor 38 and ground 192, and the collector electrode c is connected to unidirectional potential B+ through serially connected resistors 198 and 200, and to the base electrode b through resistor 196. The base electrode b of transistor 190 is connected to the junction between serially connected resistors 198 and 200.

In the operation of variable frequency oscillator 32, resistor 196 biases transistor 192 between cut-off and saturation, or partially "on," which in turn biases transistor 190 partially "on." The magnitude and polarity of an error signal applied to electrical conductors 36 and 38 thus controls the impedance of transistor 190 and the frequency of variable frequency oscillator 32. A positive signal at electrical conductor 36 will increase the frequency of variable frequency oscillator 32 by reducing the impedance of transistor 192 and 190, and a negative signal at electrical conductor 36 decreases the frequency of variable frequency oscillator 32 by increasing the impedance of transistors 192 and 190.

The variable frequency oscillator circuit 32 is completed by the amplification and pulse forming means, which includes transistor 202, which may be of the NPN junction type having a base electrode b, a collector electrode c, and an emitter electrode e, and resistors 204 and 206. Resistors 204 and 206 are serially connected across the unidirectional potential B+ and ground 192, with the collector electrode c of transistor 202 and electrical conductor 40 being connected to the junction between resistors 204 and 206. Base electrode b is connected to base-one (B1) of unijunction transistor 180, and the emitter electrode e is connected to ground 192. Thus, in the absence of a positive pulse at base-one (B1) of unijunction transistor 180, the potential applied to electrical conductor 40 is determined by the magnitude of the unidirectional voltage B+ and the voltage divider which includes resistors 204 and 206. When a positive pulse is applied to the base electrode b of transistor 202 from base-one (B1), electrical conductor 40 will be momentarily connected to ground 192.

If the high gain provided by the class A amplifier in variable frequency oscillator 32 is not required, the circuit may be simplified by eliminating transistors 190 and 192 and resistors 194, 196, 198, 200, by connecting a resistor between base-two (B2) of unijunction transistor 180 and resistor 184, and connecting electrical conductors 36 and 38 directly across this added resistor.

Electrical inverter 34 is similar in construction and operation to electrical inverter 23 hereinbefore described. The components of electrical inverter 34 will be given reference numerals for aid in explaining the other circuit functions of electrical inverter system 20, but their interconnection and operation will not be described, as the description of electrical inverter 23 may be referred to.

Specifically, electrical inverter 34 includes countdown stages 210, 212, and 214. Since each countdown stage is similar, the components of stage 210 will be given reference numerals, with corresponding components in stage 212 given the same reference numerals with a single prime mark, and the corresponding elements in stage 214 being given the same reference numerals with a double prime mark.

Countdown stage 210 includes transistors 216 and 218, which may be of the NPN junction type shown, each having a base electrode b, a collector electrode c, and an emitter electrode e, resistors 220 and 222, diodes or rectifiers 224 and 226, capacitors 228 and 230, and a transformer 232 having primary and secondary windings 234 and 236, respectively, disposed in inductive relation with a magnetic core 238. The primary winding of transformer 232, as well as the primary windings 232' and 232" are connected to a source of unidirectional potential B+, and the emitter electrodes e of transistors 216 and 218, as well as the emitter electrodes of transistors 216', 218', 216", and 218" are connected to ground 240.

Countdown stage 210 is coupled with stage 212 through resistors 242 and 244, countdown stage 212 is coupled with countdown stage 214 through resistors 246 and 248, and countdown stage 214 is coupled with stage 210 through resistors 250 and 252. The adjustable frequency sine wave voltage corresponding to vector 14 of FIG. 1 is produced across the serially connected secondary windings 236, 236', and 236". The serially connected secondary windings 140, 140', and 140" of electrical inverter 23 are connected in series with the serially connected secondary windings 236, 236' and 236" of inverter 34 by electrical conductor 42, and the vector sum of the fixed frequency sine wave voltage of inverter 23 and the adjustable frequency sine wave voltage of inverter 34, represented by vector 16 in FIG. 1, appears across conductors 44 and 46, which are connected to output terminals 48 and 50, respectively, as shown in FIGS. 2 and 4.

The error signal applied to electrical conductors 36 and 38 of variable frequency oscillator 32 may be produced by any suitable error detecting means. A typical error detector 52, voltage sensor 54 and current sensor 56 which may be utilized is shown in FIG. 4. Specifically, if it is desired to regulate voltage until a predetermined output current is reached, the voltage sensor 54 and current sensor 56 may be connected in parallel, with the larger of the signals produced by the voltage sensor 54 and current sensor 56 being applied to the error detector 52. Thus, the signal from the voltage sensor 54 would regulate the output voltage as long as its signal exceeded the signal from the current sensor 56. When the signal from the current sensor 56 exceeds the signal from the voltage sensor 54, then the system would be current regulated until the current signal is again less than the voltage signal. The current sensor 56 may include a current transformer 58, loaded with resistor 262, and developing a unidirectional signal at conductor 59 proportional to the current in electrical conductor 44, by virtue of rectifiers 264 and 266.

Voltage sensor 54 is responsive to the output voltage of electrical inverter system 20 through electrical conductors 60 and 62, with the electrical conductors 60 and 62 being connected to the input terminals of full wave bridge rectifier 270, which includes a plurality of rectifiers 272. The unidirectional voltage of current sensor 56 is connected to the positive output of bridge rectifier 270, and the larger of the two voltages is connected to the error detector 52 by electrical conductors 64 and 66. Error detector 52 may be a conventional Zener diode bridge error detector circuit 274 comprising two similar Zener diodes 276 and 278, and two similar resistors 280 and 282. The output terminals 284 and 286 of Zener bridge 274 are connected to electrical conductors 36 and 38, respectively. When the unidirectional voltage applied to electrical conductors 55 and 57 is equal to the reference voltage of the Zener bridge, which is equal to twice the voltage drop across one of the Zener diodes 276 and 278, the signal at output terminals 284, 286 will be zero. When the voltage applied to electrical conductors 64 and 66 is below the reference voltage, output terminal 284 will be negative with respect to output terminal 286, and when the voltage applied to electrical conductors 64 and 66 is above the reference voltage of Zener bridge 274, output terminal 284 will be positive with respect to output terminal 286. Thus, when the output voltage of electrical inverter system 20 is below the desired magnitude, electrical conductor 36 will be negative with respect to electrical conductor 38, and the frequency of variable frequency oscillator 32, shown in FIG. 3A, will be decreased, decreasing the phase angle $\theta$ between the output voltages of inverters 23 and 34, and increasing the output voltage of electrical inverter system 20. When the output voltage of electrical inverter system 20 is above the desired magnitude, electrical conductor 36 will be positive with respect to electrical conductor 38, and the frequency of variable frequency oscillator 32 will be increased, increasing the phase angle $\theta$ between the output voltages of inverters 23 and 34, and decreasing the output voltage of the electrical inverter system 20. When the output voltage of electrical inverter system 20 is at the desired magnitude, the error signal will be zero, and the frequency of the variable frequency oscillator will be unchanged.

If the output current of electrical inverter system 20 exceeds the preset limit the system changes from voltage regulation to current regulation, and the frequency of variable frequency oscillator 32 will change to provide the necessary output voltage to maintain the output current at the predetermined limit. Adjustable resistor means (not shown) may be appropriately disposed to adjust the voltage to be regulated and the current limit. Rectifiers 290 and 292 may be connected across the electrical conductors 36 and 38, with rectifier 290 being poled opposite to rectifier 292, in order to further aid in desensitizing the circuit and in limiting the frequency swing of the variable frequency oscillator by shorting out signals which exceed the threshold voltage of the rectifiers.

The electrical inverter system 20, up to this point, will produce and vectorially sum two sine wave voltages to produce an output that is apparently voltage and current regulated. However, voltage and current regulation can only be achieved if the total angular swing of the frequency of the variable frequency oscillator 32 is limited to a maximum of 180°, and the actual angle is between 0 degrees and −180°, or between 0 degrees and +180°. Without this limiting means, the error signal would change polarity when the swinging vector moves outside of these limits, and regulation would not be possible.

FIG. 3B illustrates phase angle limiting means 64 for limiting the phase angle $\theta$ to predetermined maximum and minimum limits. The phase angle swing must be limited to 180°, and must be limited to vary between 0 degrees and −180° (leading), or between 0 degrees and +180° (lagging).

FIG. 3B illustrates means for applying 0 degrees to −180° (leading) limits.

In general, the phase angle limiting means 64 includes blocking means for blocking turn-off signals from variable frequency oscillator 32, and forced "turn-on," "turn-off" means for independently controlling the switching of the stages of the inverter 34.

More specifically, the blocking means for preventing turn-off signals from variable frequency oscillator 32 from being applied to countdown stages 210, 212, and 214 of inverter 34, includes a plurality of steering resistors 300, 302, 304, 306, 308 and 310. Resistor 300 is connected from the collector electrode $c$ of transistor 144 in inverter 23 to the junction between diode 224 and capacitor 228 in the base circuit of transistor 216 in inverter 34. Resistor 300 reverse biases diode 224 as long as transistor 144 is in its non-conductive condition. Thus, turn-off signals applied to the electrical conductor 40 are blocked from the base electrode $b$ of transistor 216 during the portion of time that transistor 144 is in its non-conductive condition.

In like manner, resistors 302, 304, 306, 308 and 310 are connected from the collector electrodes $c$ of transistors 146, 144′, 146′, 144″ and 146″, respectively, in inverter 23, to the junctions between the diode and capacitor in the base circuits of transistors 218, 216′, 218′, 216″ and 218″, respectively, in inverter 34. Thus resistors 300, 302, 304, 306, 308 and 310 prevent the inverter 34 from switching too soon, and thus establishes one of the limits of the phase angle swing.

The forced turn-on, turn-off means prevent the inverter 34 from switching too late, and thus establishes the other limit of the phase angle swing. The forced turn-on, turn-off means includes capacitors 312, 314, 316, 318, 320 and 322, and diodes or rectifiers 324, 326, 328, 330, 332 and 334.

Capacitor 312 is connected from the collector electrode $c$ of transistor 146 in inverter 23 to the base electrode $b$ of transistor 216 in inverter 34. When transistor 146 switches to its conductive condition, capacitor 312 draws current from the base electrode $b$ of transistor 216, switching it to its non-conductive condition if it is not already non-conductive. When transistor 146 switches to its non-conductive condition, capacitor 312 forward biases the base electrode $b$ in transistor 216, turning it on or switching it to its conductive condition if it is not already conductive. Diode 324 is connected from ground 336 to the base electrode $b$ of transistor 216, and poled to conduct electrical current from ground to the base electrode $b$, and thus provides a discharge path for capacitor 312 to discharge from one plate through the collector-emitter path of transistor 146 to ground when transistor 146 becomes conductive, and from ground through diode 324 to the opposite capacitor plate of capacitor 312.

In like manner, capacitors 314, 316, 318, 320 and 322 are connected from the collector electrodes c of transistors 144, 146′, 144′, 146″ and 144″, respectively to the base electrodes b of transistors 218, 216′, 218′, 216″ and 218″, respectively. The discharge path diodes 326, 328, 330, 332 and 334 are connected from ground 336 to the base electrodes b of transistors 218, 216′, 218′, 216″ and 218″, respectively.

Figure 5:
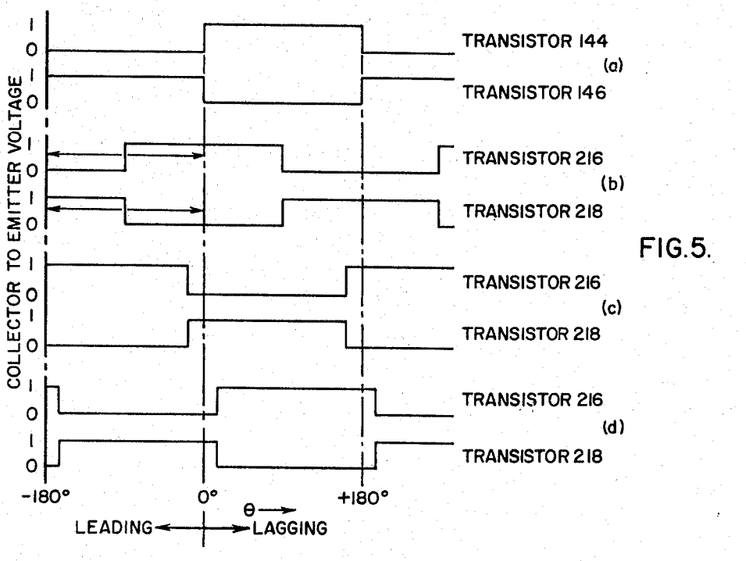
FIG. 5 comprises Graphs a through d illustrating the operation of the phase shift limiting means.

FIG. 5 graphically illustrates the operation of the phase shift limiting means, by plotting the collector to emitter voltages of the transistors in stage 130 of inverter 23 and stage 210 of inverter 34 on the ordinate against the phase angle $\theta$ on the abscissa. Since the collector to emitter voltages are plotted, the numeral 1 indicates that the transistor is non-conductive, or cut-off, and the numeral 0 indicates that the transistor is conductive or saturated. FIG. 5, Graph a ilustrates the switching action of transistors 144 and 146 or stage 130 in inverter 23, and FIG. 5, Graph b illustrates the proper switching of transistors 216 and 218 of stage 210 in inverter 34. Transistors 216 and 218 may switch between 0 degrees and $-180°$ leading, as indicated by the arrows.

FIG. 5, Graph c illustrates a first operating condition of stage 210 which would be prevented by phase angle limiting means 64. Stage 210 of inverter 34 is switching too soon, and leading stage 130 of inverter 23 by more than the preset limit. This condition could only occur because of signals from the variable frequency oscillator 32, and thus it is the function of the steering resistors to prevent these signals from being applied to inverter 34 before the allowable range of the phase angle is reached. More specifically, it will be noted in FIG. 5, Graph a, that transistor 146 is off or non-conductive between $-180°$ and 0 degrees, thus diode 226 is reverse biased by resistor 302, and transistor 218 cannot be turned off as shown in FIG. 5, Graph c, between $-180°$ and 0 degrees. During the time $-180°$ to 0 degrees, transistor 146 is cut-off, and turn-off signals from variable frequency oscillator 32 during this period will be blocked away from transistor 218. Thus, the condition shown in FIG. 5, Graph c cannot occur, and the voltage from inverter 34 cannot lead the voltage from inverter 23 by more than 180°, because of the action of the steering resistors.

FIG. 5, Graph d illustrates a second operating condition of countdown stage 210 which would be prevented by phase angle limiting means 64. Countdown stage 210 is shown switching too late, and lagging behind stage 130 by a few degrees. This condition is caused by a lack of signals from the variable frequency oscillator 32 at the proper time, and thus cannot be corrected by blocking signals from the variable frequency oscillator 32. Thus, it is the function of the forced turn-on, turn-off capacitors and diodes to prevent the condition shown in FIG. 5, Graph d. More specifically, it will be noted that in FIG. 5, Graph a, transistor 144 turns off or is switched to its non-conductive condition at zero degrees, and transistor 146 turns on, or is switched to its conductive condition at zero degrees. When transistor 144 turns off at zero degrees, capacitor 314 applies a positive pulse to the base electrode b of transistor 218. Since transistor 218 in FIG. 5, Graph d at the zero degree point is off, it will be switched to its conductive condition, and thus cannot lag behind the preset limit. When transistor 218 turns on, it will turn transistor 216 off by the fluip-flop action as hereinbefore explained. However, transistor 216 will also receive a turn-off signal from capacitor 312 at the zero degree point, as when transistor 146 switches to its conductive condition at the zero degree point, capaictor 312 draws current from the base electrode b of transistor 216, acting as a reverse bias and switching transistor 216 to its non-conductive condition.

The action of the phase angle limiting means 64 has been only described relative to stages 210 and 130 of inverters 34 and 23, respectively, as the limiting action between the remaining corresponding countdown stages of inverters 34 and 23 operate in a similar manner.

In summary, the steering resistors prevent the voltage from inverter 34 from leading the voltage from inverter 23 by more than the preset limit. When the limits are $-180°$ to 0 degrees, the steering resistors limit the voltage from inverter 34 from leading the voltages from inverter 23 by more than 180° and in this instance they form the 180° limits. When the limits are $+180°$ to 0 degrees, the steering resistors limit the voltage from inverter 34 from leading the voltage from inverter 23, and in this instance they form the zero degree limit. The forced turn-on, turn-off capacitors and diodes prevent the voltage from inverter 34 from lagging the voltage from inverter 23 by more than the preset limit. When the limits are $-180°$ to 0 degrees, the capacitors and diodes prevent the voltage from inverter 34 from lagging the voltage from inverter 23, and in this instance, they form the zero degree limit. When the limits are $+180°$ to 0 degrees, the capacitors and diodes limit the voltage from inverter 34 from lagging the voltage from inverter 23 by more than 180°, and in this instance they form the 180° limit. Thus, broadly stated, it is the function of the steering resistors to limit the voltage from inverter 34 from leading the voltage from inverter 23 by more than the predetermined amount, and it is the function of the capacitors and diodes to limit the voltage from inverter 34 from lagging the voltage from inverter 23 by more than the predetermined amount.

As hereinbefore stated, the inverter system 20 shown in FIGS. 3A and 3B is connected to operate within the phase shift limits of $-180°$ to 0 degrees. It will be observed that the inverter system 20 may be operated within the phase shift limits of $+180°$ to 0 degrees, merely by making the appropriate changes in the connections of the steering resistors and capacitors in inverter 34. It will also be observed that the phase angle swing may be limited to any multiple of $180/N$ degrees, where N is equal to the number of countdown stages in inverter 23. For example, the phase shift limits may be changed to $-120$ degrees (leading) and zero degrees by moving the electrical conductors from resistors 302, 304, 306, 308, and 310 from the junctions between the diodes and capacitors shown in FIG. 3B, to the junction between the diodes and capacitors immediately to the left of their former position, and moving the eletcrical conductor from resistor 300 to the junction between capacitor 230″ and diode 226″, formerly occupied by the electrical conductor from resistor 310.

The range of allowable phase angle shift may be changed to $-180°$ (leading) to $-60°$ (leading) by moving the electrical conductors from the common connection between the capacitors and diodes in the phase shift limiting means 64, from the base electrodes b of the transistors 216, 218, 216′, 218′, 216″ and 218″ shown in FIG. 3B, to the base electrodes b of the transistor immediately to the right of the present position, and moving the electrical conductor from the common connection of diode 334 and capacitor 322 from the base electrode b of transistor 218″ to the base electrode b of transistor 216.

If the electrical inverter system 20 is connected such that the phase angle between the sine wave voltage produced by inverter 23 and the sine wave voltage produced by inverter 34 may approach zero degrees, it would be desirable to sense this condition and lock the two voltages in phase until such time as the regulating means calls for the voltages to be out of phase by a predetermined amount. An in-phase sensor and locking circuit is desirable in order to prevent the variable frequency voltage from "bouncing" between zero degrees and some small angle, such as five degrees, at a rapid rate when the regulating system is trying to drive the variable frequency voltage past the zero degree limit. An in-phase sensor and locking circuit is also desirable if maximum efficiency is required, as maximum efficiency occurs when the two voltages are in phase.

For example, assume the regulating system is set to regulate the output voltage at 115 volts, but that even with the voltages in phase, the output voltage is only 114 volts, due to a low input voltage, an overload on the inverter, or both. Assuming that the overload does not reach the current limit, the voltage sensor 54 will sense the low voltage and the error detector 52 will apply an appropriate signal to the variable frequency oscillator 32 in an attempt to increase the output voltage. Since the voltages are already in phase, the output voltage cannot be increased, and the variable frequency oscillator 32 will attempt to drive the variable frequency voltage past zero degrees, but the zero degree limit means will not allow this to occur. Eventually, one of the pulses from the variable frequency oscillator 32 will trigger the inverter 34 ahead of time, if the inverter is limited to $-180°$ and 0 degree limits, or behind time if the inverter is limited to operation between $+180°$ and 0 degrees, causing the angle between the voltage to change slightly. The phase angle will again return to zero, and repeat the cycle, causing the phase angle to change rapidly between zero degrees and some small angle, such as five degrees. Thus, an in-phase locking circuit is required to prevent this from happening. The in-phase locking circuit must automatically deenergize itself should the output voltage rise above the regulating setting, or in the event the output current exceeds the preset limit.

FIG. 3A illustrates an in-phase sensor and locking circuit 84 which will provide the desired functions of sensing when the voltages are in phase, locking them in phase, and deenergizing itself when the circuit condition calls for the voltages to be out of phase.

The in-phase locking circuit 84 includes means for applying the signal from frequency reference 24 to the variable frequency oscillator 32, which includes transistors 352 and 354, which may be of the NPN junction type each having a base electrode $b$, a collector electrode $c$ and an emitter electrode $e$, resistors 356 and 358, a diode or rectifier 360, and coupling capacitor 362. The collector electrodes $c$ of transistors 352 and 354 are connected to a unidirectional potential B+ through resistor 358, and to base-two (B2) of unijunction transistor 180 in variable frequency oscillator 32 through coupling capacitor 362. The base electrode $b$ of transistor 352 is connected to frequency reference 24 through resistor 356 and electrical conductor 90, the emitter electrode $e$ of transistor 352 is connected to the base electrode $b$ of transistor 354, and the emitter electrode $e$ of transistor 354 is connected to ground 364. Diode or rectifier 360 is connected from the base electrode $b$ of transistor 352 to ground, and poled to block current flow from the base electrode $b$ to ground.

In-phase locking circuit 84 includes means for shorting the frequency reference signal from frequency reference 24 away from transistor 352 when the voltages are not in phase, which includes transistors 366 and 367, which may be of the NPN junction type each having a base electrode $b$, an emitter electrode $e$, and a collector electrode $c$, resistors 368, 370, 372 and 374, a capacitor 376, a full wave bridge rectifier 378, having a plurality of rectifiers 380 connected to input terminals 382 and 384, and output terminals 386 and 388, and a transformer 390 having windings 392 and 394 disposed in inductive relation with the magnetic core 396.

Winding 392 of transformer 390 is connected to electrical conductors 86 and 88, which are connected to be responsive to stage 210 of inverter 34 and stage 130 of inverter 23. Winding 394 of transformer 390 is connected to the input terminals 392 and 384 of full wave bridge rectifier 378. Output terminal 388 of bridge rectifier 378 is grounded at 364, and output terminal 386 is connected to the base electrode $b$ of transistor 367 through resistor 374. Collector electrode $c$ of transistor 367 is connected to unidirectional potential B+ through resistor 372, and the emitter electrode $e$ is connected to ground 364 through capacitor 376, and also through serially connected resistors 368 and 370. The base electrode $b$ of transistor 366 is connected to the junction between resistors 368 and 370, the emitter electrode $e$ is connected to ground 364, and the collector electrode $c$ is connected to the base electrode $b$ of transistor 352.

Figure 6:
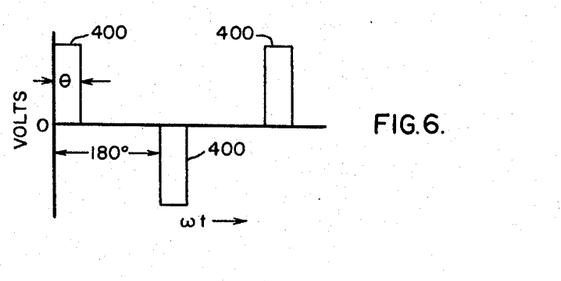
FIG. 6 is a graph which aids in the explanation of the in-phase locking means.

Transformer 390, having its primary 392 connected to be responsive to corresponding stages of inverters 34 and 23, such as stages 210 and 130, will apply a voltage having a quasi square wave from its secondary winding 394 to the input terminals 382 and 384 of bridge rectifier 378. The voltage on the primary winding 392 of transformer 390 will be as shown in FIG. 6, with the width of the voltage pulses 400 being responsive to the phase angle $\theta$ between the two inverter voltages, which is the same phase angle $\theta$ shown in FIG. 1 between voltage vectors 12 and 14. The angular distance between the leading edges of the voltage pulses 400 is 180°. If the voltage vectors 12 and 14 are in phase, the pulses would disappear, as the phase angle would be zero, and the pulses widen as the phase angle increases. The full wave rectifier 378 rectifies the pulses shown in FIG. 6 to produce a series of rectangular pulses occurring at twice the frequency of the output voltage of inverter system 20. Transistor 367 is forward biased, and thus switched to its conductive condition, at the beginning of a pulse from rectifier 378, and capacitor 376 is charged at a rate determined by the time constant of resistor 372 and capacitor 376. The time constant of resistor 372 and capacitor 376 is selected to fully charge capacitor 376 to B+ volts in a predetermined time which is short compared to the overall voltage cycle of the output voltage. For example, the time constant may be selected to charge capacitor 376 to B+ volts in a time corresponding to 5 degrees of the total voltage cycle. The circuit which includes transistor 367 and resistors 372 and 374 are merely for impedance matching purposes to prevent loading the countdown stages of inverters 34 and 23 while obtaining the required fast charging rate for capacitor 376. The peak voltage of the rectified pulses applied to the base electrode $b$ of transistor 367 should be higher than B+ to insure that transistor 367 saturates whenever it switches to its conductive condition.

The time constant of resistor 368 and capacitor 376 is selected to allow the voltage on capacitor 376 to fall from B+ to NB+ (where N is less than 1) in 175° of an output voltage cycle. The values of the circuit components are selected to switch transistor 366 to its conductive state when capacitor 376 is charged to a voltage between NB+ and B+. When transistor 366 is conductive, the frequency reference signal from frequency reference 24 is grounded, due to the collector electrode $c$ of transistor 366 being connected to the base electrode $b$ of transistor 352. Thus, when the output voltage of inverter 34 is not in phase with the output voltage of inverter 23, the variable frequency oscillator 32 is not affected in any way by the frequency reference signal from frequency reference 24, as the frequency reference signal is grounded through transistor 366.

When the phase angle $\theta$ between the two inverter voltages decreases and approaches zero degrees, the width of the rectified voltage pulses applied to transistor 367 decreases. Since capacitor 376 cannot charge to B+ volts if the phase angle is less than, for example five degrees, the voltage on capacitor 376 will fall below NB+ volts before the next voltage pulse occurs. The value of resistor 370 is selected such that the base drive voltage of transistor 366 falls below its threshold value when the voltage across capacitor 376 falls below NB+ volts by a predetermined small amount. When transistor 366 switches to its non-conductive condition, the signal from the frequency reference is applied between the base electrode b of transistor 352 and the emitter electrode e of transistor 354. The frequency reference signal is then coupled from the collector electrodes c of transistors 352 and 354 to base-two (B2) of unijunction transistor 180 in variable frequency oscillator 32. Thus, the variable frequency oscillator must operate at the frequency of the inverter oscillator 22, and the voltage output of inverter 34 will be in phase with the voltage output of inverter 23. If the electrical inverter system is set up to operate between −180° and 0 degrees, capacitor 362 is selected to be small enough that the variable frequency oscillator 32 can operate at a frequency higher than the reference frequency, thus allowing these circuits to de-energize themselves when circuit conditions no longer call for the voltages to be in phase.

The voltage regulating circuit in the arrangement shown in FIG. 3A and FIG. 3B is arranged such that an increase in the frequency of the variable frequency voltage will decrease the voltage output. Therefore, if the output voltage of electrical inverter system 20 is below the regulator setting, and the phase angle $\theta$ is very close to zero degrees, the variable frequency oscillator 32 will lock in with the master oscillator 22 and their vectors will be in phase. If the output voltage should rise above the regulator setting, or if the output current should rise above its predetermined limit, the variable frequency oscillator frequency will increase, the angle $\theta$ will increase, and the output of the inverter will decrease. If the phase angle $\theta$ increases to the five degrees selected for purposes of example, transistor 366 will turn on and ground the reference frequency signal away from transistor 352. It is necessary to ground the synchronizing signal from the frequency reference 24 away from variable frequency oscillator 32 in order to allow variable frequency oscillator 32 to return to its normal operation, which involves both the generation of frequencies higher and lower than the frequency of the master oscillator 22.

While the locking means has been described relative for use with the inverter system 20 when the predetermined minimum phase angle limit is zero, it will be obvious that the circuit could be modified to lock the voltage into any predetermined minimum phase angle limit that is being utilized in the electrical inverter system, in order to stabilize the system when it is operated at its lower limit and in order to provide the maximum efficiency for the system.

In summary, there has been disclosed a new and improved electrical inverter system which utilizes the principles of phase shift regulation, and which utilizes only one master oscillator and one variable frequency oscillator regardless of the number of countdown stages in the inverters. The phase shift regulator system is successful due to the effective means for limiting the angular swing of the variable frequency oscillator, and due to the in-phase sensing and locking means required for stable operation and high efficiency. The electrical inverter system has a minimum of components, has a high efficiency and has a fast transient response time to load changes. For example, an electrical inverter system was constructed according to the teachings of the invention using two 750 va. inverters. The system was loaded with 1500 watts resistive load and the measured efficiency was 88.5%. With inversion stages designed specifically for high efficiency, the efficiency of the system could conceivably exceed 90 percent. A load equivalent to 75% of full load was switched on and off, and oscilloscope pictures indicated a transient response time between 5 and 10 milliseconds using a 400 c.p.s. inverter.

Since numerous changes may be made in the above-described apparatus and different embodiments of the invention may be made without departing from the spirit thereof, it is intended that all matter contained in the foregoing description or shown in the accompanying drawings shall be interpreted as illustrative, and not in a limiting sense.

We claim:
1. An electrical inverter system comprising:
first oscillator means for providing signals at a fixed rate,
first inverter means having a plurality of countdown stages,
said first inverter means being connected in circuit relation with said first oscillator means and providing a first voltage having a frequency responsive to the fixed rate of the signals from said first oscillator means,
second oscillator means for providing signals at a controllable rate,
second inverter means having a plurality of countdown stages,
said second inverter means being connected in circuit relation with said second oscillator means and providing a second voltage having a frequency responsive to the rate of the signals from said second oscillator means,
vector summing means for vectorially summing said first and second voltages to provide a third voltage,
error detecting means for providing an error signal responsive to the deviation of an electrical quantity of the electrical inverter system from a predetermined magnitude,
said second oscillator means being connected in circuit relation with said error detecting means and producing signals at a rate responsive to said error signal,
said error signal controlling the frequency of said second voltage to provide a phase angle between said first and second voltages which maintains the electrical quantity of the electrical inverter system at substantially the predetermined magnitude,
resistor means connected between the countdown stages of the first inverter means and the countdown stages of the second inverter means for setting a predetermined limit on the amount of said second voltage can lead said first voltage,
and capacitor means connected between the countdown stages of said first inverter means and the countdown stages of said second inverter means for setting a predetermined limit on the amount said second voltage can lag said first voltage.
2. An electrical inverter system comprising:
first oscillator means for providing signals at a fixed rate,
first inverter means having a plurality of flip-flop switching stages,
said first inverter means being connected in circuit relation with said first oscillator means and providing a first voltage having a frequency determined by the signal rate of said first oscillator means,
second oscillator means for providing signals at a controllable rate,
second inverter means having a plurality of flip-flop switching stages,
said second inverter means being connected in circuit relation with said second oscillator means and providing a second voltage having a frequency responsive to the signal rate of said second oscillator means,
means for vectorially summing said first and second voltages to provide the output voltage of the electrical inverter system,
error detecting means for providing an error signal responsive to the deviation of predetermined output electrical quantities of said electrical inverter system from predetermined magnitudes,
said error detecting means being connected in circuit relation with said second oscillator means,
said error signal controlling the rate of the signals provided by said second oscillator means to provide a phase angle between said first and second voltages which will regulate said predetermined output quantities of the electrical inverter system, resistor means connected between the flip-flop switching stages of said first inverter means and the flip-flop switching stages of said second inverter means, said resistor means blocking the signals from said second oscillator means away from said second inverter means when the first and second voltages have a predetermined phase angle to provide a first limit on the phase angle range, and capacitor means connected between the flip-flop swtiching stages of said first inverter means and the flip-flop switching stages of said second inverter means, said capacitor means switching the flip-flop switching stages of said second inverter means when said first and second voltages have a predetermined phase angle, to provide a second limit on the phase angle range, 3. An electrical inverter system comprising:

first oscillator means for providing switching signals at a fixed rate, first inverter means having a plurality of transistors connected to provide a plurality of flip-flop switching stages, said first inverter means being connected in circuit relation with said first oscillator means and providing a first voltage having a frequency determined by the switching signal rate of said first oscillator means, second oscillator means for providing switching signals at a controllable rate, second inverter means having a plurality of transistors connected to provide a plurality of flip-flop switching stages, said second inverter means being connected in circuit relation with said second oscillator means and providing a second voltage having a frequency responsive to the switching signal rate of said second oscillator means, means for vectorially summing said first and second voltages to provide the output voltage of the electrical inverter system, error detecting means for providing an error signal responsive to the deviation of the output voltage from a predetermined magnitude when the output circuit is less than a predetermined limit, and providing an error signal responsive to output current when the predetermined limit is reached, said error detecting means being connected in circuit relation with said second oscillator means, said error signal controlling the rate of the switching signals provided by said second oscillator means to provide a phase angle between said first and second voltages which will regulate the output voltage of said electrical inverter system and provide current limiting, resistor means connected between the transistors in said first and second inverter means, said resistor means blocking the switching signals away from the transistors they are connected to in said second inverter means when the transistors they are connected to in the first inverter means are non-conductive, to provide a first limit on the phase angle between said first and second voltages, and capacitor means connected between the transistors in the said first and second inverter means, said capacitor means applying a turn-on signal to the transistors they are connected to in said second inverter means when the transistors they are connected to in said first inverter means switch to their non-conductive condition, to provide a second limit on the phase angle between said first and second voltages.

4. An electrical inverter system comprising:

first means including a reference frequency and a first oscillator for providing a first voltage having a fixed frequency, second means including a second oscillator for providing a second voltage having a controllable frequency, third means for vectorially summing said first and second voltages to provide a third voltage, fourth means for providing an error signal responsive to the deviation of said third voltage from a predetermined magnitude, said error signal being applied to said second means for controlling the frequency of said second voltage and provide a phase angle between said first and second voltages that will maintain said third voltage at substantially the predetermined magnitude, fifth means for limiting said phase angle to predetermined minimum and maximum values, and sixth means for sensing when said phase angle is at the predetermined minimum value, said sixth means applying said reference frequency to said second means until the phase angle increases to a predetermined magnitude.

5. An electrical inverter system comprising:

first means including a reference frequency and a first oscillator for providing a first voltage having a fixed frequency, second means including a second oscillator for providing a second voltage having a controllable frequency, third means for vectorially summing said first and second voltages to provide a third voltage, fourth means for controlling the frequency of said second voltage in response to predetermined electrical conditions of the electrical inverter system to provide a phase angle between said first and second voltages that will regulate said predetermined electrical conditions, fifth means for limiting the phase angle between said first and second voltages between zero degrees and a predetermined maximum, and sixth means for sensing when the phase angle between said first and second voltages is substantially zero, said sixth means applying said reference frequency to said second means until the phase angle reaches a predetermined magnitude.

6. An electrical inverter system comprising:

reference frequency means for providing signals at a predetermined fixed rate, first oscillator means connected in circuit relation with said reference frequency means and providing signals at a fixed rate responsive to said reference frequency means, first inverter means having a plurality of countdown stages, said first inverter means being connected in circuit relation with said first oscillator means and providing a first voltage having a frequency responsive to the signals from said first oscillator means, second oscillator means for providing signals at a controllable rate, second inverter means having a plurality of countdown stages, said second inverter means being connected in circuit relation with said second oscillator means and providing a second voltage having a frequency responsive to the signals from said second oscillator means, vector summing means for vectorially summing said first and second voltages to provide the output voltage of the electrical inverter system, error signal means connected in circuit relation with said second oscillator means for controlling the frequency of said second voltage in response to predetermined electrical conditions of the electrical inverter system to provide a phase angle between said first and second voltages that will regulate said predetermined electrical conditions, phase angle limiting means for limiting the phase angle between said first and second voltages to a minimum of zero degrees and a predetermined maximum, and in phase locking means for sensing when said phase angle is substantially zero and applying the signals from said reference frequency to said second oscillator means until said phase angle increases to a predetermined magnitude, said in phase locking means including first means connected between predetermined countdown stages of said first and second inverter means for obtaining signals having a duration responsive to the phase angle between said first and second voltages, and second means connected between said reference frequency and said second oscillator means, said second means being responsive to the duration of the signals obtained by said first means to block the signals from said reference frequency means away from said second oscillator means when the signals provided by said first means exceed a predetermined duration, and to connect the signals from said frequency reference means to said second oscillator means when the signals provided by said first means have less than a predetermined duration.

7. An electrical inverter system comprising:

reference frequency means for providing signals at a predetermined fixed rate, first oscillator means connected in circuit relation with said reference frequency means and providing signals at a fixed rate responsive to said reference frequency means, first inverter means having a plurality of countdown stages, said first inverter means being connected in circuit relation with said first oscillator means and providing a first voltage having a frequency responsive to the signals from said first oscillator means, second oscillator means for providing signals at a controllable rate, second inverter means having a plurality of countdown stages, said second inverter means being connected in circuit relation with said second oscillator means and providing a second voltage having a frequency responsive to the signals from said second oscillator means, vector summing means for vectorially summing said first and second voltages to provide the output voltage of the electrical inverter system, error signal means connected in circuit relation with said second oscillator means for controlling the frequency of said second voltage in response to predetermined electrical conditions of the electrical inverter system to provide a phase angle between said first and second voltages that will regulate said predetermined electrical conditions, phase angle limiting means for limiting the phase angle between said first and second voltages to a predetermined range, and in-phase locking means for sensing the magnitude of said phase angle and for applying the signals from said reference frequency to said second oscillator means when said phase angle is at its predetermined minimum until the phase angle increases to a predetermined magnitude, said in-phase locking means including transformer means, rectifier means, capacitor means, means for connecting the signals from said reference frequency means to said second oscillator means, and means for blocking the signals from said reference frequency means away from said second oscillator means, said transformer means being connected between predetermined countdown stages of said first and second inverters for obtaining signals having a duration response to the phase angle between said first and second voltages, said rectifier means being connected in circuit relation with said transformer means for supplying rectified signals having a duration responsive to said phase angle, said capacitor means being connected in circuit relation with said rectifier means and said blocking means and being charged by said rectified signals from said rectifier means, said blocking means being responsive to the phase angle through the charging time of said capacitor to block the signals from said reference means away from said second oscillator means when the charging time exceeds a predetermined magnitude.

References Cited

UNITED STATES PATENTS

| | | | |
|---|---|---|---|
| 3,010,062 | 11/1961 | Van Emden | 321—45 X |
| 3,031,629 | 4/1962 | Kadri | 331—52 X |
| 3,189,813 | 6/1965 | Frierdich | 321—45 |
| 3,205,424 | 9/1965 | Bates | 321—18 |
| 3,248,635 | 4/1966 | Corey | 321—45 X |
| 3,271,654 | 9/1966 | Schlabach | 321—5 |
| 3,278,827 | 10/1966 | Corey et al. | 321—18 X |
| 3,295,044 | 12/1966 | Pledger et al. | 321—5 |
| 3,297,936 | 1/1967 | Ruch | 321—18 |
| 3,309,600 | 3/1967 | Wellford | 321—5 X |
| 3,311,807 | 3/1967 | Rodaer | 321—45 X |

JOHN F. COUCH, *Primary Examiner.*

WARREN E. RAY, *Examiner.*

WM. SHOOP, *Assistant Examiner.*